J. Y. McCLINTOCK.

PROCESS OF MAKING PAVEMENTS

APPLICATION FILED OCT. 27, 1910.

Reissued Aug. 4, 1914. 13,785.

WITNESSES

Eric Schinger

Alice M. Johanns.

INVENTOR

J. Y. McClintock

BY

Frank Keifer

ATTORNEY

UNITED STATES PATENT OFFICE.

J. Y. McCLINTOCK, OF ROCHESTER, NEW YORK.

PROCESS OF MAKING PAVEMENTS.

13,785. Specification of Reissued Letters Patent. Reissued Aug. 4, 1914.

Original No. 957,985. dated May 17, 1910, Serial No. 460,900. Application for reissue filed October 27, 1910. Serial No. 589,508.

*To all whom it may concern:*

Be it known that I, J. Y. McCLINTOCK, a citizen of the United States, residing at Rochester, in the county of Monroe and State of New York, have invented certain new and useful Improvements in Processes of Making Pavements; and I do hereby declare the following to be a full, clear, and exact description of the invention, such as will enable others skilled in the art to which it appertains to make and use the same.

My invention relates to a process of making pavements and is designed for putting a wearing surface upon highways suitable for the requirements of high speed traveling and heavy loads.

Figure 1:
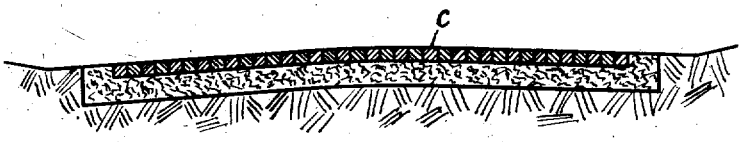
Figure 2:
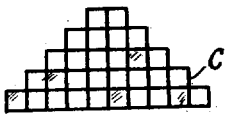
Figure 3:
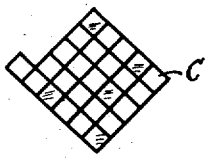
Figure 4:
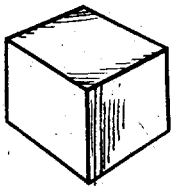

In the accompanying drawings, which show a pavement laid according to my process Figure 1 is a section of a roadbed showing my invention. Figs. 2 and 3 are partial top plan views thereof, and Fig. 4 is a perspective view on an enlarged scale of one of the small vitrified brick blocks.

*a* represents the sub-grade, *b* the foundation and *c* the pavement.

In carrying my invention into practice, I use small cubes made of vitrified brick, Portland cement, concrete, asphalt blocks, or even blocks of stone, glass or iron. I prefer, however, blocks of vitrified brick or Portland cement concrete or asphaltic concrete for general purposes. These blocks are cubes approximately two inches on each side. As these blocks are in the form of very small cubes, the pavement may be laid as is ordinarily done with broken stone. The foundation having been prepared and made smooth on the surface either by puddling in the case of macadam or gravel, or having been coated with mortar, or having been made with concrete with a smooth surface, the cubes of vitrified brick are dumped from the conveying cart and spread out with ordinary stone forks or potato hooks. The form of the cubes insures that they will always rest upon their bases. The cubes are then raked together as closely as possible by means of the forks or rakes and the spaces between the cubes are filled with pitch, grout, cement, mortar, or other suitable material. No effort is made to have the cubes break joints on the surface of the roadway, but the joints may be made in general by raking the blocks so that they will lie diagonal to the direction of the line of traffic.

The advantages of my invention are that in the case of vitrified brick the small size of the pieces will insure thorough vitrification with no necessity for throwing away some of the blocks for defects, thus greatly cheapening the preparation of the blocks. Other economies arising from this invention are due to the saving of labor in making the bricks; the saving of bricks now lost by distortion in the kiln and improper burning on account of large size; the labor of loading and unloading to and from cars and to and from carts; saving the necessity of putting a cushion of sand between the foundation and the wearing surface, avoiding the necessity of skilled labor, which is ordinarily required in laying a pavement; and the saving of freight, cartage and the general cost of handling and needless waste of surfacing material which occurs under the existing practice. In most cases the saving will amount to from 30 to 50 per cent. My invention is also applicable in resurfacing roads already made. This can usually be done without removing the old and worn surface of the road, since to raise such a road two inches in height will not materially interfere with either the grade or the crown, whereas to raise it five or six inches would increase the expense and, in some cases at least, would be impracticable on account of the increase in slope or height.

The well known macadam road has proved very efficient for heavy loads which are drawn by animal power, but for self-propelled vehicles it is far less satisfactory because said vehicles rip up, disintegrate, and blow away the binding, resulting in injury to the road and an almost intolerable dust nuisance. My invention does away with these objections and is equally well adapted for vehicles drawn by animals and self-propelled vehicles. It withstands the pounding effect of the horses' hoofs and affords a sufficient foot-hold without slipping, and properly distributes the load upon the wearing surfaces and also meets the requirements of the present traffic in that it cannot rip up nor disintegrate its binding to self-destruction nor make a dangerous dust nuisance, furnishing a hard, smooth surface admirably adapted to the demand for high speed traveling and yet without any detriment thereto from tractive and machine effects.

Having thus described my invention, I claim:—

1. The process of making pavements, which consists of preparing a suitable foundation, spreading small cubical blocks of vitrified brick or other suitable material on said foundation, raking said blocks together into a compact layer and filling up the space between them, substantially as described.

2. A pavement having a suitable foundation and a wearing surface of small cubical blocks of suitable paving material substantially two inches each way, raked together on the foundation and grouted, substantially as described.

3. A pavement having a suitable foundation and a wearing surface of small cubical blocks of suitable paving material substantially two inches each way, placed together on the foundation and grouted, substantially as described.

4. A pavement having a suitable foundation and a wearing surface of small cubical molded blocks of suitable paving material substantially two inches each way, placed together on the foundation and grouted, substantially as described.

5. A pavement for horse, wagon and other vehicle traffic, having a suitable foundation, a surface of cubical blocks spread thereon, each of said blocks being substantially two inches in length, width and thickness, each side of said block being suitable for a base or wearing surface, permitting said blocks to be dumped in the roadway and spread out at random on a smooth base in a single compact layer of uniform thickness.

6. A pavement for horse, wagon and other vehicle traffic, having a suitable foundation, a surface of cubical blocks spread thereon, each of said blocks being substantially two inches in length, width and thickness, all the sides of said block being finished substantially alike and each being suitable for a base or wearing surface, permitting said blocks to be dumped in the roadway and spread out at random on a smooth base in a single compact layer of uniform thickness.

7. A pavement having a suitable foundation with a wearing surface thereon composed of small cubical blocks of suitable paving material, substantially two inches each way, the six sides of said blocks being substantially alike, said blocks being arranged closely side by side, substantially as described.

In testimony whereof, I affix my signature, in presence of two witnesses.

J. Y. McCLINTOCK.

Witnesses:
ERIC ISCHINGER,
ALICE M. JOHANNS.